United States Patent
Peterson et al.

(10) Patent No.: US 9,813,605 B2
(45) Date of Patent: Nov. 7, 2017

(54) APPARATUS, METHOD, AND PROGRAM PRODUCT FOR TRACKING ITEMS

(71) Applicant: LENOVO (Singapore) PTE, LTD., New Tech Park (SG)

(72) Inventors: Nathan J. Peterson, Durham, NC (US); John Carl Mese, Cary, NC (US); Russell Speight VanBlon, Raleigh, NC (US); Rod D. Waltermann, Rougemont, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 153 days.

(21) Appl. No.: 14/529,926

(22) Filed: Oct. 31, 2014

(65) Prior Publication Data
US 2016/0125587 A1 May 5, 2016

(51) Int. Cl.
*G06K 9/00* (2006.01)
*H04N 5/232* (2006.01)

(52) U.S. Cl.
CPC ..... *H04N 5/23206* (2013.01); *G06K 9/00208* (2013.01); *H04N 5/23241* (2013.01)

(58) Field of Classification Search
CPC .................. G06K 9/00771; G06K 2017/0045
See application file for complete search history.

(56) References Cited

U.S. PATENT DOCUMENTS

| | | | | |
|---|---|---|---|---|
| 6,005,610 A | * | 12/1999 | Pingali | G01S 3/808 348/14.16 |
| 7,221,775 B2 | * | 5/2007 | Buehler | G06K 9/00771 348/E5.058 |
| 8,850,597 B1 | * | 9/2014 | Gates | G06F 17/30528 726/26 |
| 8,855,672 B1 | * | 10/2014 | Cohn | H04W 4/02 455/41.2 |
| 9,055,071 B1 | * | 6/2015 | Gates | H04L 63/1408 |
| 9,165,361 B1 | * | 10/2015 | Ely | G06T 3/00 |
| 2002/0001398 A1 | * | 1/2002 | Shimano | G06K 9/6293 382/104 |
| 2005/0146433 A1 | * | 7/2005 | Waltermann | G01S 15/74 340/553 |
| 2005/0286745 A1 | * | 12/2005 | Kamata | G06K 9/00013 382/115 |
| 2006/0078170 A1 | * | 4/2006 | Kamata | G06K 9/00 382/115 |
| 2006/0187305 A1 | * | 8/2006 | Trivedi | G06K 9/00234 348/169 |
| 2006/0245649 A1 | * | 11/2006 | Chen | G06K 9/50 382/173 |

(Continued)

OTHER PUBLICATIONS

TheTileApp, "Tile—the world's largest lost and found—wallet finder and key tracker app", https://www.youtube.com/watch?v=pqDm3gZNZPM, video.*

*Primary Examiner* — Gandhi Thirugnanam
(74) *Attorney, Agent, or Firm* — Kunzler Law Group (57) ABSTRACT

Apparatuses, methods, systems, and program products are disclosed for tracking items. An identification module identifies an item using one or more sensors of an information handling device. A location module receives location data for the item in response to identifying the item. A communication module shares the location data with one or more different information handling devices.

18 Claims, 5 Drawing Sheets

(56) References Cited

U.S. PATENT DOCUMENTS

| | | | | |
|---|---|---|---|---|
| 2010/0002941 A1* | 1/2010 | Fonseca | ............ | G06K 9/00664 |
| | | | | 382/209 |
| 2012/0148103 A1* | 6/2012 | Hampel | ............ | G06K 9/00771 |
| | | | | 382/103 |
| 2014/0379296 A1* | 12/2014 | Nathan | ................. | G06Q 10/08 |
| | | | | 702/150 |
| 2015/0116501 A1* | 4/2015 | McCoy | ............ | H04N 5/23206 |
| | | | | 348/169 |
| 2015/0172634 A1* | 6/2015 | Wheeler | ........... | H04N 13/0014 |
| | | | | 348/47 |

* cited by examiner

APPARATUS, METHOD, AND PROGRAM PRODUCT FOR TRACKING ITEMS

BACKGROUND

Field

The subject matter disclosed herein relates to communication devices and more particularly relates to tracking items using sensors of a device.

Description of the Related Art

Portable information handling devices, such as tablet computers, smart phones, optical head-mounted display units, smart watches, etc., are becoming ubiquitous in society. For example, a family may have a handful of tablet computers, laptop computers, smart phones, etc. that are used by and shared among various family members. Generally, many of these devices include cameras and/or a variety of sensors that can be used to capture and receive data describing a device's environment, including different items or other devices that are located around the device. Because these devices can be easily shared and used by different users, the devices can be easily misplaced or lost. In addition to misplacing information handling devices, people consistently misplace other items, such as keys, wallets, and purses, which can be frustrating and time consuming to try to find.

BRIEF SUMMARY

An apparatus for tracking items is disclosed. A method and computer program product also perform the functions of the apparatus. In one embodiment, an apparatus includes one or more sensors associated with an information handling device and a processor that is coupled to the one or more sensors. The apparatus, in certain embodiments, includes a memory that stores code executable by the processor. The code, in various embodiments, identifies an item using the one or more sensors. In a further embodiment, the code receives location data for the item in response to identifying the item. The code may share the location data with one or more different information handling devices.

In a further embodiment, a sensor of the one or more sensors comprises a camera that captures one or more images of the item in response to identifying the item. In such an embodiment, the location data for the item includes the one or more captured images. In one embodiment, the item is identified by using a pattern recognition algorithm. In some embodiments, a sensor of the one or more sensors comprises a wireless signal sensor that identifies one or more wireless signals transmitted by the item. In such an embodiment, data received using the wireless signal sensor comprises an identifier for the item, which may include an identifier selected from the group consisting of a media access control (MAC) address, an internet protocol (IP) address, a near-field communication (NFC) identifier, and a Bluetooth® identifier.

In one embodiment, the apparatus further includes code that registers an item with the information handling device comprising the one or more sensors such that the item is identifiable by the one or more sensors of the information handling device. In certain embodiments, the information handling device comprising the one or more sensors is in communication with the one or more different information handling devices. In such an embodiment, the location data is shared using a peer-to-peer network configuration. In some embodiments, the location data for the item is stored on a server in communication with the information handling device comprising the one or more sensors and the one or more different information handling devices. In such an embodiment, the server may include one of a local area network server and a cloud server.

In certain embodiments, the location data comprises one or more of global positioning system (GPS) data, a latitude/longitude pair, and relative positioning data. In a further embodiment, the location data further comprises a timestamp comprising a time and a date that the item was identified. In some embodiments, the location data for the item is continually received in response to the one or more sensors tracking movement for the item after the item has been identified.

A method for tracking items, in one embodiment, includes identifying, by use of a processor, an item using one or more sensors associated with an information handling device. In some embodiments, the method includes receiving location data for the item in response to identifying the item. In a further embodiment, the method includes sharing the location data with one or more different information handling devices.

In some embodiments, a sensor of the one or more sensors comprises a camera that captures one or more images of the item in response to identifying the item. In such an embodiment, the location data for the item comprises the one or more captured images. In a further embodiment, a sensor of the one or more sensors comprises a wireless signal sensor that identifies one or more wireless signals transmitted by the item. In various embodiments, the location data received using the wireless signal sensor comprises an identifier for the item, which may be selected from the group consisting of a media access control (MAC) address, an internet protocol (IP) address, a near-field communication (NFC) identifier, and a Bluetooth® identifier.

In one embodiment, the method further includes registering an item with the information handling device comprising the one or more sensors such that the item is identifiable by the one or more sensors of the information handling device. In certain embodiments, the location data comprises one or more of global positioning system (GPS) data, a latitude/longitude pair, and relative positioning data. In various embodiments, the location data for the item is stored on a server in communication with the information handling device comprising the one or more sensors and the one or more different information handling devices. In such an embodiment, the server comprises one of a local area network server and a cloud server.

In one embodiment, a program product includes a computer readable storage medium that stores code executable by a processor. The executable code, in certain embodiments, comprises code to perform identifying an item using one or more sensors associated with an information handling device. In a further embodiment, the executable code includes code to perform receiving location data for the item in response to identifying the item. The executable code, in some embodiments, comprises code to perform sharing the location data with one or more different information handling devices.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms a, an, and the also refer to one or more unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
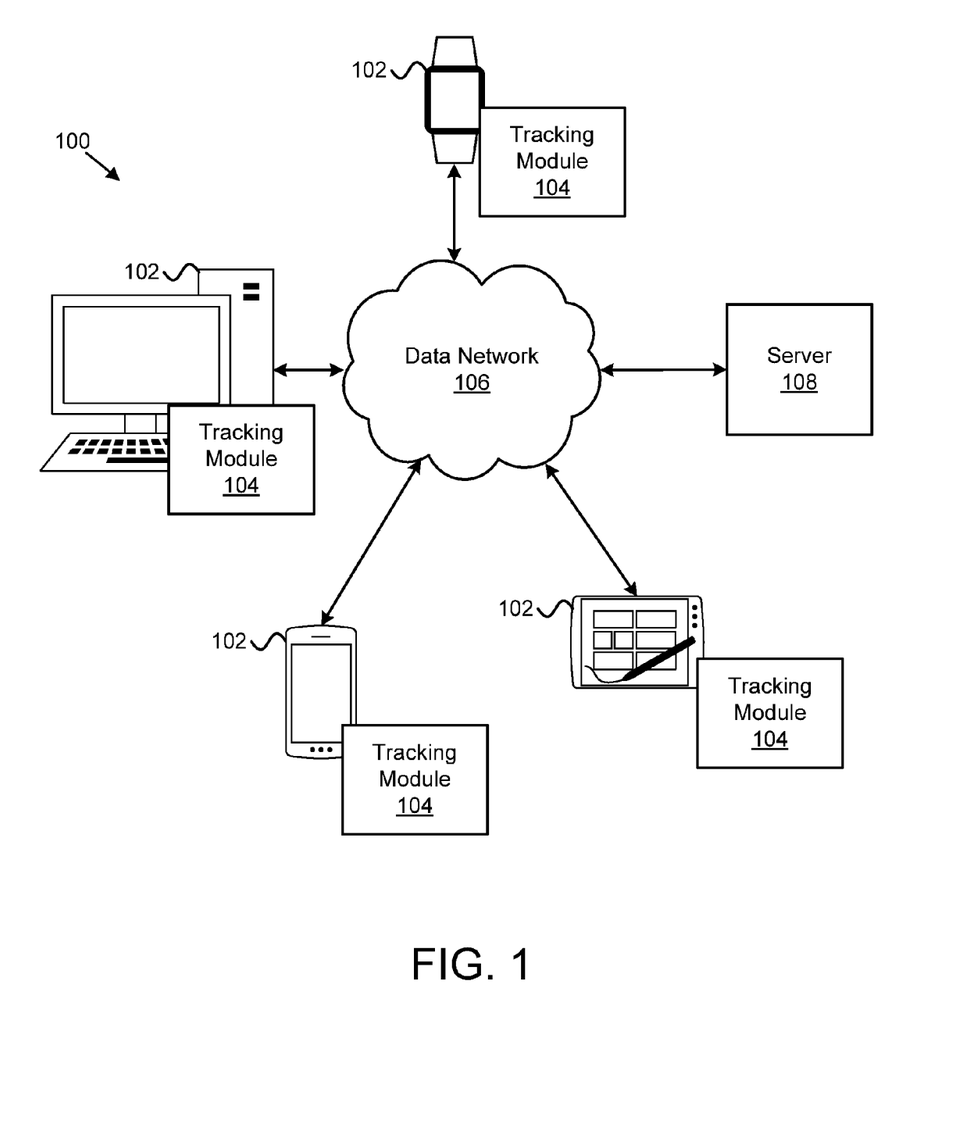
FIG. 1 is a schematic block diagram illustrating one embodiment of a system for tracking items.

FIG. 1 depicts one embodiment of a system 100 for tracking items. In one embodiment, the system 100 includes information handling devices 102, tracking modules 104, data networks 106, and servers 108. Even though a specific number of information handling devices 102, tracking modules 104, data networks 106, and servers 108 are depicted in FIG. 1, one of skill in the art will recognize that any number of information handling devices 102, tracking modules 104, data networks 106, and servers 108 may be included in the system 100.

In one embodiment, the information handling devices 102 comprise computing devices, such as desktop computers, laptop computers, personal digital assistants (PDAs), tablet computers, smart phones, smart televisions (e.g., televisions connected to the Internet), set-top boxes, game consoles, security systems (including security cameras), or the like. In some embodiments, the information handling devices 102 comprise wearable devices, such as smart watches, fitness bands, optical head-mounted displays, or the like. In one embodiment, the information handling devices 102 include one or more cameras and sensors, such as proximity sensors, wireless signal sensors, and/or the like.

The information handling devices 102, and/or the server 108, may include an embodiment of the tracking module 104. In certain embodiments, the tracking module 104 is configured to identify an item using one or more sensors of an information handling device 102. The tracking module 104 may receive location data for the item, and may share the location data with one or more different information handling devices 102. In this manner, the tracking module 104 tracks items around a user's house, office, car, or the like, such that the user can locate, find, or otherwise determine where the items were last seen by the information handling device 102 in the event that the user misplaces the item, loses the item, forgets where the item is, has the item stolen, or the like. In certain embodiments, the tracking module 104 includes various modules that perform one or more of the operations of the tracking module 104, which are described in more detail below with reference to FIG. 2.

The data network 106, in one embodiment, comprises a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

In one embodiment, the servers 108 include computing devices, such as desktop computers, laptop computers, mainframe computers, cloud servers, virtual servers, and/or the like. In some embodiments, the servers 108 are configured as application servers, email servers, database servers, file servers, game servers, home servers, media servers, web servers, and/or the like. In certain embodiments, the servers 108 are configured to store data related to an identified item, and may be configured to be accessed by one or more information handling devices 102 through the network 106. The servers 108 may include at least a portion of the tracking module 104 and may perform one or more operations of the tracking module 104.

Figure 2:
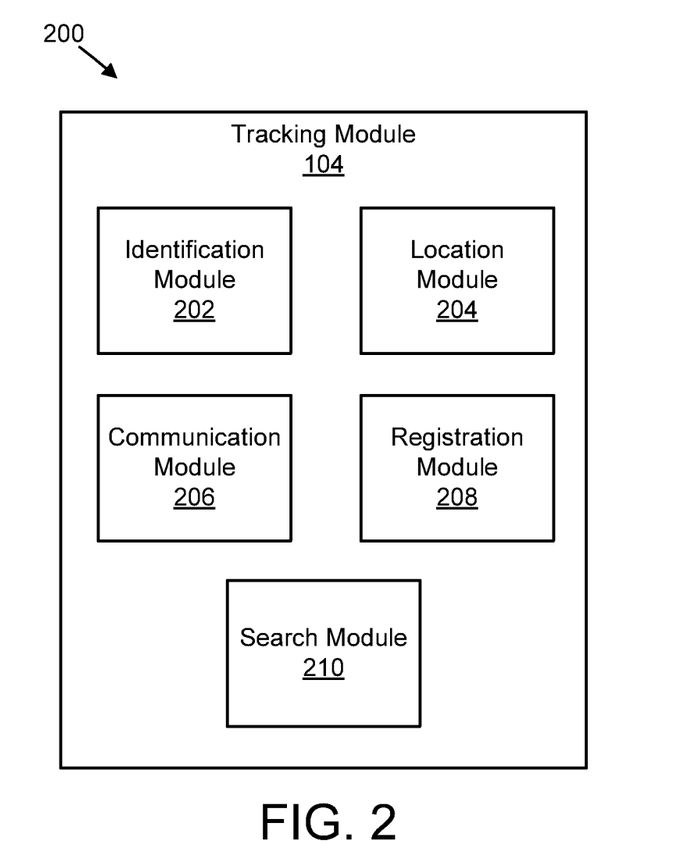
FIG. 2 is a schematic block diagram illustrating one embodiment of a module for tracking items.

FIG. 2 depicts one embodiment of a module 200 for tracking items. In one embodiment, the module 200 includes an embodiment of a tracking module 104. In certain embodiments, the tracking module 104 includes an identification module 202, a location module 204, a communication module 206, a registration module 208, and a search module 210, which are each described in more detail below.

The identification module 202, in one embodiment, is configured to identify an item using one or more sensors of an information handling device 102. In some embodiments, the information handling device 102 has been designated as a tracking device 102 to track one or more specific items. In certain embodiments, the one or more sensors may be integrated into an information handling device 102, communicatively coupled to an information handling device 102 (e.g., via a wired or wireless network connection, a USB connection, or the like), and/or otherwise associated with the information handling device 102. In some embodiments, the items may comprise "smart" items such as tablet computers, smart phones, laptops, or the like. In certain embodiment, the items may comprise "dumb" items such as keys, bags, wallets, documents, or the like.

In one embodiment, the one or more sensors comprises one or more cameras for the information handling device 102. In certain embodiments, the identification module 202 uses the one or more cameras to identify items within a viewing area of the one or more cameras. In some embodiments, the identification module 202 captures images from the camera at predetermined intervals. For example, the identification module 202 may be configured to take an image with the one or more cameras every 5 minutes, every 10 minutes, or the like.

In certain embodiments, the identification module 202 is configured to take an image in response to being located at a preconfigured tracking location, e.g., at home, at the office, in the car, or the like. In such an embodiment, the identification module 202 may "wake-up," or otherwise activate, the camera in response to being within a predetermined tracking location. In this manner, the identification module 202 may preserve or conserve battery life of the information handling device 102 because the camera is not persistently on or activated. For example, the identification module 202 may activate the camera on a user's smart phone in response to the user walking into the user's house. In such an embodiment, the identification module 202 may capture images from the camera at predetermined intervals while the smart phone is located in the house. In this manner, the identification module 202 may track other items within the home, such as keys, tablet computers, wallets, toys, or the like by taking images of the items, or more specifically, taking periodic images of the room or area where the smart phone is located.

In a further embodiment, the one or more sensors may comprise wireless signal sensors, such as Wi-Fi sensors, near-field communication (NFC) sensors, radio frequency sensors, Bluetooth® sensors, or the like. The identification module 202 may use one or more wireless sensors to detect and/or identify one or more "smart" items that transmit wireless signals. For example, the identification module 202 may detect a smart phone by receiving, intercepting, or the like, wireless signals transmitted from the smart phone, such as Wi-Fi signals, Bluetooth® signals, NFC signals, cellular signals, or the like.

In one embodiment, the identification module 202 receives one or more identifiers for the identified device 102 from the one or more sensors. In certain embodiments, the one or more identifiers may comprise a media access control (MAC) address for the device 102, a network interface controller (NIC) identifier, an IP address, a Bluetooth® or NFC identifier, or the like. For example, a tablet that has been designated as an item tracker (discussed below with reference to the registration module 208) may identify a user's iPhone® in response to detecting a wireless signal being transmitted by the iPhone® and receiving the iPhone's® MAC address. In this manner, the identification module 202 can correctly identify the iPhone® as the user's iPhone® and not an iPhone® for another user.

Other types of sensors used by the identification module 202 may include proximity sensors. As used herein, a proximity sensor is a sensor able to detect the presence of nearby objects without any physical contact. A proximity sensor, in certain embodiments, emits an electromagnetic field or a beam of electromagnetic radiation (infrared, for example), and detects changes in the field or return signal. In certain embodiments, if the identification module 202 detects the presence of an item using a proximity sensor, the identification module 202 may then use a different sensor determine an identifier for the item. For example, in response to determining the presence of an item using the proximity sensor, the identification module 202 may take an image using a camera or attempt to detect wireless signals being transmitted by the item using one or more wireless signal sensors.

In some embodiments, the one or more sensors comprises a motion detection sensor. In such an embodiment, the identification module 202 may trigger one or more other sensors in response to the motion sensor being activated, e.g., if the motion sensor detects motion. For example, the identification module 202 may continually capture images using a camera and/or continually attempt to detect wireless signals being transmitted by the item in response to the motion detection sensor detecting and/or tracking the item's motion.

Upon detection of an item, in one embodiment, the identification module 202 may reference a data store, such as a database, list, or the like, of items that have been registered to be tracked, as described below with reference to the registration module 208. For example, the identification module 202 may reference a database of registered devices 102 to look up a MAC address received from a device 102 in order to identify the device 102, e.g., to receive more information about the device 102 such as who owns the device 102, the type of device 102, or the like.

In certain embodiments, the identification module 202 may reference a data store, such as a database of images of items that have been registered to be tracked in order to identify a particular item. In some embodiments, the identification module 202 performs one or more pattern recognition analyses on a captured image of an item in order to identify the item. For example, the identification module 202 may capture an image of a user's set of keys that have been set down on a kitchen table. The identification module 202 may perform pattern recognition on the image, in order to determine one or more items or objects in the image, and compare the images of the items to one or more images of registered items stored in the data store. In this manner, the identification module 202 may identify a particular item that has been registered to be tracked.

In one embodiment, the location module 204 receives location data for the item in response to identifying the item. In certain embodiments, the location module 204 may continuously receive location data for the item in response to the identification module 202 tracking the movement of the item, e.g., using a motion sensors and/or one or more other sensors. The location data, in one embodiment, may comprise coordinates for a global position system (GPS) and/or latitude/longitude pair coordinates associated with the information handling device 102 tracking the item and/or the item. For example, a web cam for a desktop computer in a family room may capture an image of a user's purse sitting on a table. The location module 204 may receive GPS coordinates for the desktop computer and associate the received coordinates with the purse, or more particularly, with the captured image of the purse.

In a further embodiment, the location of the item may be received from the item and/or from a different entity associated with the item, such as a cloud service, or the like. For example, the identification module 202 for a user's smart phone may identify a tablet computer and the location module 204 for the user's smart phone, in response to identifying the tablet computer, may receive the tablet computer's location from the tablet computer. Alternatively, or additionally, the location module 204 may receive the tablet's location from one or more cloud or remote location services associated with the tablet computer. In such an embodiment, the smart phone may be communicatively coupled to the tablet computer or the remote location services, via a wired or wireless network connection.

The location module 204, in certain embodiments, may implement various location-determining methods, such as triangulation and/or dead reckoning. As used herein, triangulation may refer to the process of determining a location by measuring angles to it from known points at either end of a fixed baseline. For example, the location module 204 may determine a relative location for a set of keys based on the locations of one or more items, e.g., "smart" devices 102, located around the set of keys. Alternatively, the location module 204 may analyze an image of an item to determine a location for the item based on the location of the tracking device 102 and one or more other items within the image.

The location module 204 may also use dead reckoning to determine a location for an item. As used herein, dead reckoning may refer to the process of calculating a position by using a previously determined position, or fix, and advancing that position based upon known or estimated speeds over elapsed time and course. For example, the location module 204 may use a motion sensor, or the like, to determine a previous position of a moving item (e.g., such as if a user is carrying a tablet computer) and estimated speeds to determine a future position over a period of time. Thus, the location module 204 may provide an estimate of an item's location based on a previous position of the item.

In certain embodiments, the location module 204 may be associated with a particular location. For example, a location module 204 may be located on an Xbox®, Playstation®, or other set-top box or gaming console that sits in a stationary position for a period of time without being moved, such as in a family room, a bedroom, or the like. In such an embodiment, the location module 204 may be associated with the location, e.g., the room, where it is located. Thus, the location data for the location module 204, in such an embodiment, may comprise a description of a room or area of a home, e.g., the family room, Bob's bedroom, the master bedroom, or the like. Similar embodiments, may comprise security systems, where the location module 204 may be associated with a location of a security camera, such as a camera on the front porch of a house, a camera located on the garage, or the like.

The location module 204, in one embodiment, associates a timestamp with the location data. In certain embodiments, the timestamp comprises a date and/or time of when the location data was received. For example, the location module 204 may associate a timestamp with an image of an item, or an area where the item is located, taken by the identification module 202. In another example, the location module 204 may associate a timestamp with GPS coordinates, or other location data, received from the item, the tracking device, remote location services, or the like.

The communication module 206, in one embodiment, shares the location data with one or more different information handling devices 102. In one embodiment, the communication module 206 shares the location data with one or more different information handling devices 102 by storing the location data on a server 108 accessible by the one or more different devices 102, such as a cloud server, a server on a local area network (LAN), or the like. For example, the communication module 206 may store one or more images of the item captured by the identification module 202 (using a camera of an information handling device 102, for example), an identifier for the item, and the location data received by the location module 204, on a cloud server 108 such that one or more other information handling devices 102 may access the images and the location data associated with the item.

In a further embodiment, the communication module 206 shares the location data with one or more different information handling devices 102 by directly sending the identification information (e.g., images, unique identifiers, etc.) for the item, and the location data, to one or more other information handling devices 102. Such an embodiment may be setup in a peer-to-peer network, or other distributed network architecture that includes a plurality of information handling devices 102. In certain embodiments, the peer-to-peer network may include a central server 108 that facilitates data transmission. In some embodiments, interconnected devices 102 share data without the use of a centralized server 108.

In one embodiment, the communication module 206 sends one or more notifications from a tracking device 102 to one or more different devices 102 in response to detecting or identifying an item that has been designated as an item to be tracked. For example, if the tracking device 102 has been designated as a device 102 to track a user's smart phone, the communication module 206 may send a notification in response to the identification module 202 located on the tracking device 102 identifying the user's smart phone. The notification may comprise the time and/or date the item was identified, which tracking device 102 identified the item, the location of the item, and/or the like. In this manner, the communication module 206 provides a proactive and informative way for user's to keep track of their items, such as devices 102 that are used by multiple users in a home or office setting.

In certain embodiments, the communication module 206 sets, assigns, associates, or the like one or more security settings for data associated with the item. The communication module 206, for example, may password protect the data such that only authorized users and/or devices 102 are allowed to access the data with a valid password. In another example, the communication module 206 may maintain a list of authorized users and/or devices 102 such that only users and/or devices 102 that have been placed on the list are allowed to access the data.

Similarly, the communication module 206 may only make data associated with an item accessible to a predetermined set or list of users, or devices 102 associated with the users. For example, in a home setting, the communication module 206 may only grant access to data stored on a home server to a set of devices 102 associated with people who live in the home, e.g., one or more users may be designated as system administrators and may define which users or devices 102 may have access to the tracking data. Alternatively, and/or additionally, the communication module 206 may set different security settings or levels on different tracking data. For example, a user may want to be the only person allowed to track his tablet computer, and, as such, the communication module 206 would only make the tracking data associated with the user's tablet available to that user (e.g., via authentication credentials, or the like).

In one embodiment, the registration module 208 registers an item with an information handling device 102 that is configured to track the item such that the item is identifiable using one or more sensors of the information handling device 102. In one embodiment, the registration module 208 is located on a device 102 that includes a camera. In such an embodiment, the registration module 208 may take one or more images of an item to be tracked by the device 102, perform pattern recognition or another pattern analysis method to determine the item in the images, and store the images of the item. In this manner, the tracking device 102 can be taught to recognize a particular item and to track that item when the item is recognized by the identification module 202.

Thus, for example, the registration module 208 may take one or more images of a user's set of keys. The registration module 208 may capture images from various angles and under different lighting environments in order to learn how the keys appear under different conditions. The registration module 208 may perform pattern recognition analysis on the images in order to determine the lines, patterns, or the like of the keys such that the recognition module 208 may recognize the user's set of keys from images taken by the identification module 202, for example, at a different point in time.

In one embodiment, the registration module 208 receives one or more tags, keywords, or the like for the item at the time that the item is registered. In one embodiment, the registration module 208 associates the one or more tags with the item such that a user, via the search module 210 described below, may search tracking data based on keywords, tags, or other descriptive information associated with the item.

In one embodiment, the registration module 208 registers an item with a tracking device 102 by receiving a wireless signature for the item. The wireless signature may comprise an IP address, a MAC address, an NFC identifier, a Bluetooth® identifier, a radio frequency identifier, or the like. The registration module 208 may store the registered wireless signature, and at a different point in time, the identification module 202 may refer to the stored wireless signature such that the identification module 202 may identify the item. For example, the registration module 208 may register a MAC address for a tablet computer such that when the identification module 208 receives a MAC address from a device 102, the identification module 202 may check the received MAC address against a registered MAC address to determine whether the received MAC address is the MAC address for the tablet computer.

In certain embodiments, the identification module 202 may only track items that have been registered with the registration module 208. For example, the identification module 202 may receive an IP address from a wireless signal being transmitted by a smart phone 102. In response to receiving the IP address, the identification module 202 may refer to a list or data store of one or more registered IP addresses. If the identification module 202 determines that the IP address is a registered IP address, the identification module 202 may capture one or more images of the smart phone 102, may communicate with the location module 204 to determine the location of the smart phone 102, or the like. However, if the IP address of the smart phone has not been registered with the registration module 208, there will be no record of the IP address, and the identification module 202 may ignore the smart phone, e.g., the identification module 202 will not track the smart phone.

In one embodiment, the search module 210 receives search query data from a user and/or a device 102 to search for one or more tracked items. The search query data may include timestamps, device identifiers, tracking device identifiers, keywords, or the like. The search module 210, in some embodiments, runs a search query against a data store, or the like, of tracking data. A user, for example, may have lost his keys somewhere in his home. The user may search a database that contains a collection of tracking data, on a home server, a cloud server, or the like. The search module 210 may receive one or more search query terms, such as "keys," and/or a period of time to return tracking data, e.g., "keys, within the last week," or the like.

In such an embodiment, the search module 210 may run the search query against the database of tracking data and return results associated with the user's keys. The results may include one or more images of all items that have been identified as keys. In certain embodiments, the search module 210 may return search results that are only images of the user's keys, and possibly other user's keys that are similar to the user's keys, as long as the user has registered his keys with the registration module 208. In this manner, the user can see which devices 102 identified his keys at certain points in time, where his keys were last identified, and the last known, or previously known, locations of his keys.

Figure 3:
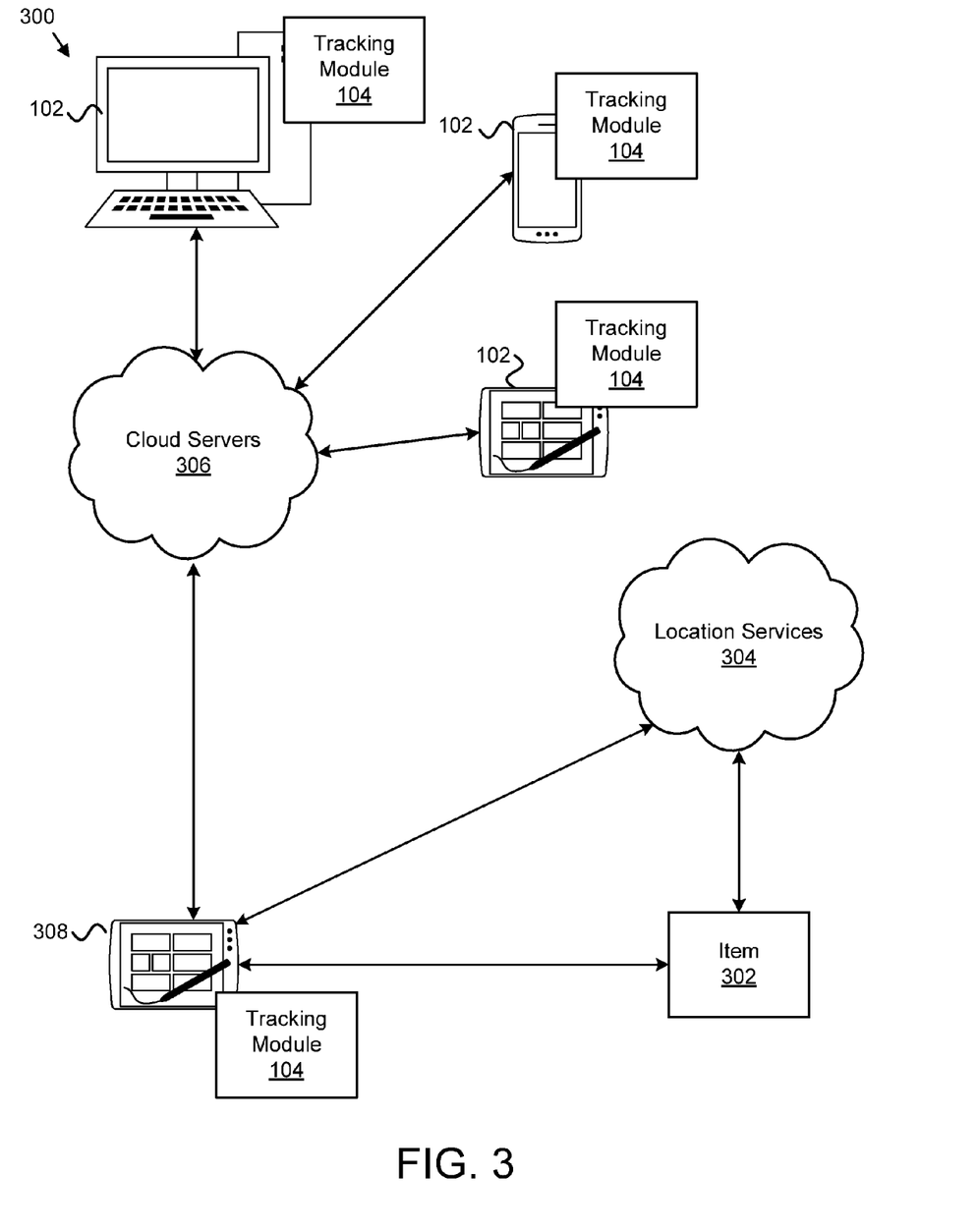
FIG. 3 is a schematic block diagram illustrating one embodiment of another system for tracking items.

FIG. 3 depicts one embodiment of a system 300 for tracking items. In one embodiment the system 300 includes a plurality of information handling devices 102, a plurality of tracking modules 104, an item 302 being tracked, a location services server 304, cloud servers 306, and a tracking device 308. In one embodiment, the tracking device 308, in particular the identification module 202 located on the tracking device 308, may identify, recognize, detect, or the like the item 302. In one embodiment, the identification module 202 identifies the item 302 in response to the item being registered with the registration module 208.

In one embodiment, the identification module 202 may identify the item 302 using one or more sensors, such as by using a camera and image recognition to detect the item 302 in one or more images, or by receiving a wireless identifier or fingerprint for the item 302. In response to the identification module 202 identifying the item 302, the location module 204 may receive location data for the item. In the depicted embodiment, the location module 204 may receive location data from a location services 304 service, such as a GPS service, or the like. In certain embodiments, the location services 304 determines the item's 302 location and sends the item's location to the location module 204 location on the tracking device 308.

In response to the location module 204 receiving the item's location, the communication module 206 shares the location data, and/or other identification data for the item, with one or more other information handling devices 102. In the depicted embodiment, the communication module 206 stores the tracking data, e.g., the location and identification data for the item 302, on one or more cloud servers 306 that are accessible by other information handling devices 102. In this manner, a user may query the cloud servers using a plurality of devices 102 that have access to the tracking data stored on the cloud servers to locate the item 302 in the event that the user has lost the item 302, for example.

Figure 4:
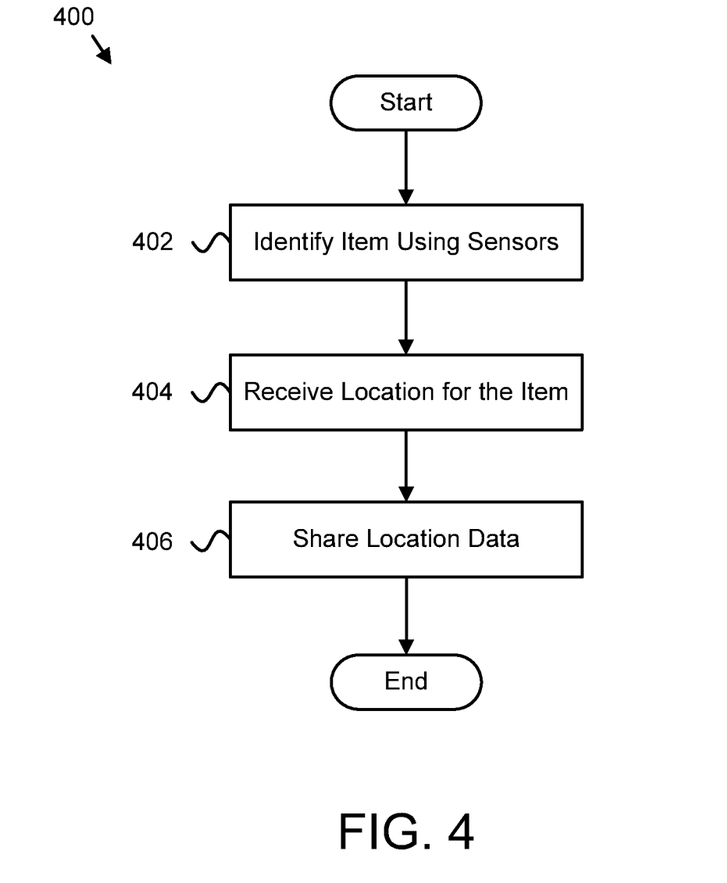
FIG. 4 is a schematic flow chart diagram illustrating one embodiment of a method for tracking items.

FIG. 4 is a schematic flow chart diagram illustrating one embodiment of a method 400 for tracking items. In one embodiment, the method 400 begins and the identification module 202 identifies 402 an item using one or more sensors of an information handling device 102. In a further embodiment, the location module 204 receives 404 location data for the item in response to identifying the item. In certain embodiments, the communication module 206 shares 406 the location data with one or more different information handling devices 102, and the method 400 ends.

Figure 5:
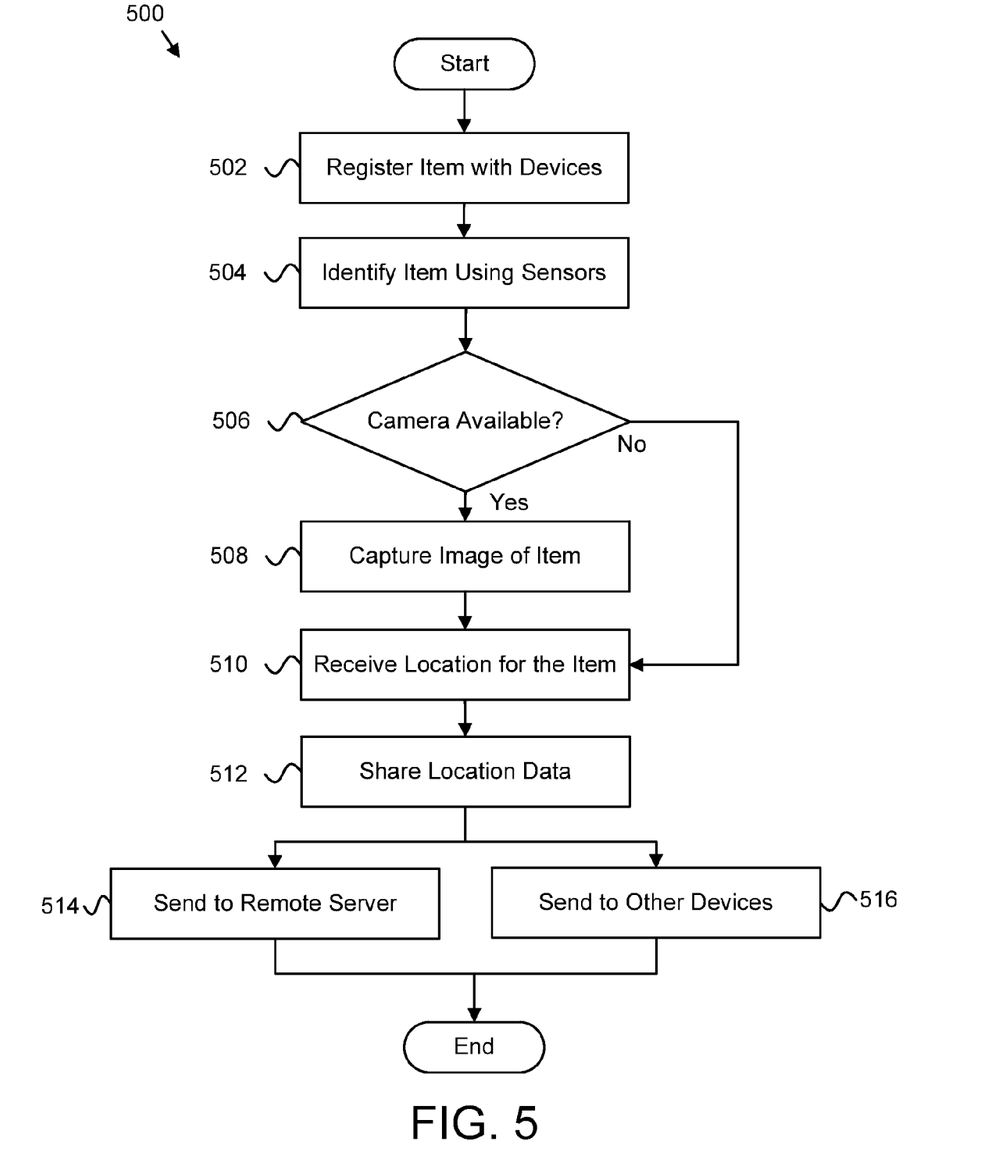
FIG. 5 is a schematic flow chart diagram illustrating one embodiment of another method for tracking items.

FIG. 5 is a schematic flow chart diagram illustrating one embodiment of a method 500 for tracking items. In one embodiment, the method 500 begins and the registration module 208 registers 502 the item with a device 102, e.g., the tracking device 102. In certain embodiments, the registration module 208 registers 502 the item by taking images of the item and performing pattern recognition analysis on the image to recognize the item in the image. In further embodiments, the registration module 208 registers 502 the item by storing a wireless identifier for the item, such as a MAC address, an IP address, or the like.

In one embodiment, the identification module 202 identifies 504 the item using one or more sensors, such as cameras, proximity sensors, wireless signal sensors, motion sensors, or the like. In some embodiment, the identification module 202 determines 506 whether the information handling device 102 has an available camera, and, if so, captures 508 one or more images of the item using the camera. In certain embodiments, in response to the identification module 202 identifying the item, the location module 204 receives 510 location data for the item, such as GPS coordinates, or the like. The location module 204, in one embodiment, receives 510 location data from the tracking device 102, e.g., the location module 204 associated the location of the device 102 tracking the item with the item. In a further embodiment, the location module 204 receives 510 location data from the item, e.g., the item may send its location (assuming the item is a "smart" device 102 capable of sending wireless signals) to the tracking device 102. In some embodiments, the location module 204 receives 510 location data from location services associated with the item, such as a GPS service, a navigation service, a mapping service, or the like.

In a further embodiment, the communication module 206 shares 512 the items location data, and/or other identifying information, such as MAC address, IP address, images, etc., with one or more other information handling devices 102. In one embodiment, the communication module 206 shares 512 the location data by sending 514 the location data, and/or other tracking data, to a remote server, such as a cloud server, a LAN server, a home network server, or the like. In some embodiments, the communication module 206 shares 512 the location data by sending 516 the location data, and/or other tracking data, directly to one or more other information handling devices 102, e.g., in a peer-to-peer network architecture. In this manner, a user can locate an item that may have been misplaced, lost, stolen, or the like based on tracking information gathered from a variety of information handling devices 102, and the method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   one or more sensors associated with an information handling device, the one or more sensors selected from the group consisting of a camera, a wireless signal sensor, and a proximity sensor;
   a processor coupled to the one or more sensors;
   a memory that stores code executable by the processor, the code comprising:
      code that registers a first item to be tracked by:
         determining one or more identifying characteristics of the first item based on one or more images captured of the first item using a camera of an information handling device;
         storing, in a data store, the one or more identifying characteristics of the first item; and
         associating one or more keyword tags with the first item;
      code that detects a presence of a second item at a point in time subsequent to registering the first item;
      code that determines one or more identifying characteristics of the second item based on one or more images captured of the second item;
      code that determines that the second item is a registered item in response to the one or more identifying characteristics of the second item corresponding to one or more identifying characteristics of the first item in the data store;
      code that determines a location of an information handling device used to detect the second item;
      code that associates the determined location of the information handling device with the second item in response to determining that the second item is a registered item;
      code that shares the location for the second item with one or more different information handling devices that have been authorized to track the second item; and
      code that determines a last known location for the registered item by searching the data store using one or more keyword tags corresponding to the keyword tags associated with the registered item when it was registered.

2. The apparatus of claim 1, wherein the camera captures one or more images of the second item in response to identifying the second item, the one or more images of the second item being shared with the location data for the second item.

3. The apparatus of claim 2, wherein the second item in the one or more images is identified by processing the one or more images using a pattern recognition algorithm.

4. The apparatus of claim 1, the wireless signal sensor identifies one or more wireless signals transmitted by the second item.

5. The apparatus of claim 4, wherein data received using the wireless signal sensor comprises an identifier for the second item.

6. The apparatus of claim 4, wherein the identifier comprises an identifier selected from the group consisting of a media access control (MAC) address, an internet protocol (IP) address, a near-field communication (NFC) identifier, and a Bluetooth® identifier.

7. The apparatus of claim 1, wherein the information handling device comprising the one or more sensors is in communication with the one or more different information handling devices, the location data being shared using a peer-to-peer network configuration.

8. The apparatus of claim 1, wherein the location data for the second item is stored on a server in communication with the information handling device comprising the one or more sensors and the one or more different information handling devices, wherein the server is selected from the group consisting of a local area network server and a cloud server.

9. The apparatus of claim 1, wherein the location data is data selected from the group consisting of global positioning system (GPS) data, a latitude/longitude pair, and relative positioning data.

10. The apparatus of claim 1, wherein the location data further comprises a timestamp comprising a time and a date that the second item was identified.

11. The apparatus of claim 1, wherein location data for the second item is continually received in response to the one or more sensors tracking movement for the second item after the second item has been identified.

12. A method comprising:
registering, by use of processor, a first item to be tracked by:
  determining one or more identifying characteristics of the first item based on one or more images captured of the first item using a camera of an information handling device;
  storing, in a data store, the one or more identifying characteristics of the first item; and
  associating one or more keyword tags with the first item;
detecting a presence of a second item at a point in time subsequent to registering the first item;
determining one or more identifying characteristics of the second item based on one or more images captured of the second item;
determining that the second item is a registered item in response to the one or more identifying characteristics of the second item corresponding to one or more identifying characteristics of the first item in the data store;
determining a location of an information handling device used to detect the second item;
associating the determined location of the information handling device with the second item in response to determining that the second item is a registered item;
sharing the location for the second item with one or more different information handling devices that have been authorized to track the second item; and
determining a last known location for the registered item by searching the data store using one or more keyword tags corresponding to the keyword tags associated with the registered item when it was registered.

13. The method of claim 12, wherein the camera captures one or more images of the second item in response to identifying the second item, the one or more images of the second item being shared with the location data for the second item.

14. The method of claim 12, further comprising detecting one or more wireless signals transmitted by the second item using a wireless signal sensor of the information handling device used to detect the second item, the one or more wireless signals identifying the item.

15. The method of claim 14, wherein the location data received using the wireless signal sensor comprises a wireless signal identifier for the second item, the identifier being selected from the group consisting of a media access control (MAC) address, an internet protocol (IP) address, a near-field communication (NFC) identifier, and a Bluetooth® identifier.

16. The method of claim 12, wherein the location data is data selected from the group consisting of global positioning system (GPS) data, a latitude/longitude pair, and relative positioning data.

17. The method of claim 12, wherein the location data for the second item is stored on a server in communication with the information handling device comprising the one or more sensors and the one or more different information handling devices, wherein the server is selected from the group consisting of a local area network server and a cloud server.

18. A program product comprising a non-transitory computer readable storage medium that stores code executable by a processor, the executable code comprising code to perform:
registering a first item to be tracked by:
  determining one or more identifying characteristics of the first item based on one or more images captured of the first item using a camera of an information handling device;
  storing, in a data store, the one or more identifying characteristics of the first item; and
  associating one or more keyword tags with the first item;
detecting a presence of a second item at a point in time subsequent to registering the first item;
determining one or more identifying characteristics of the second item based on one or more images captured of the second item;
determining that the second item is a registered item in response to the one or more identifying characteristics of the second item corresponding to one or more identifying characteristics of the first item in the data store;
determining a location of an information handling device used to detect the second item;
associating the determined location of the information handling device with the second item in response to determining that the second item is a registered item;
sharing the location for the second item with one or more different information handling devices that have been authorized to track the second item; and
determining a last known location for the registered item by searching the data store using one or more keyword tags corresponding to the keyword tags associated with the registered item when it was registered.

* * * * *